Patented Dec. 1, 1953

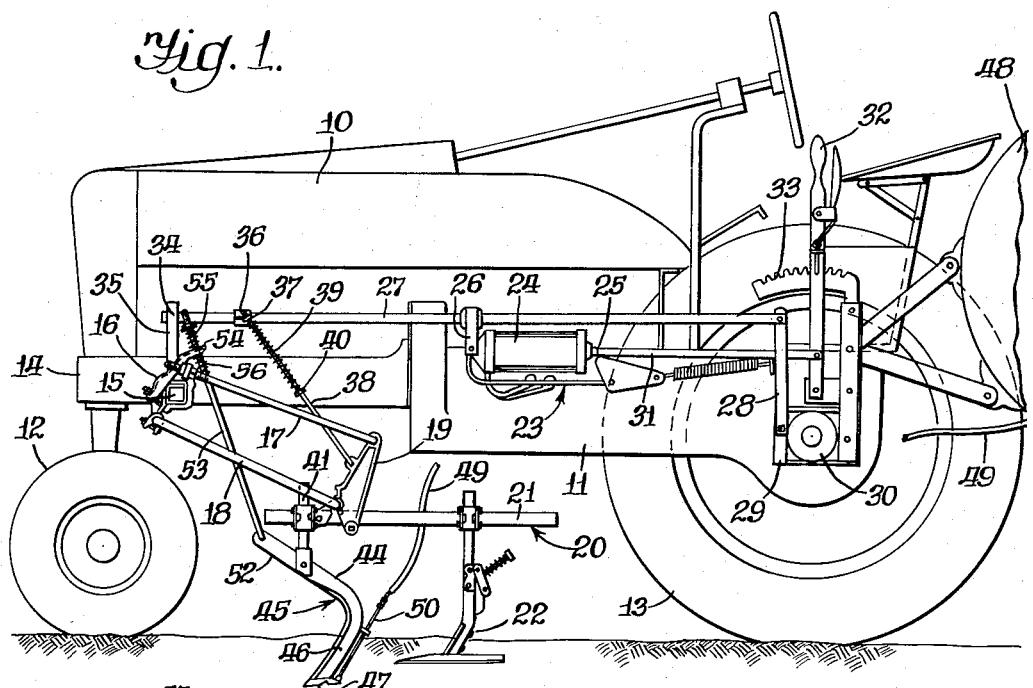

2,660,939

UNITED STATES PATENT OFFICE 2,660,939

RETRACTABLE FURROW OPENER

Stuart D. Pool, Moline, and Ernest M. Van Buskirk, East Moline, Ill., assignors to International Harvester Company, a corporation of New Jersey Application October 15, 1951, Serial No. 251,362

6 Claims. (Cl. 97—47.42)

This invention relates to agricultural implements and particularly to cultivators. More specifically, the invention concerns a fertilizer applicator for use in conjunction with a cultivator.

In supplying nitrogen as fertilizer to the soil in the form of volatile fluids such as anhydrous ammonia, it is customary to feed the fertilizer to the soil during cultivation of growing plants. A special earth-penetrating applicator is provided which is mounted on the regular cultivator gang and is supplied with the fertilizer through a flexible hose. The applicator preferably travels much deeper in the ground than the regular cultivator sweeps, and a considerable problem is created by virtue of the fact that the applicator is too close to or drags the ground when the cultivator gang is lifted. As a result, the applicator and other equipment are frequently damaged.

An object of the invention is therefore the provision in a fertilizer applicator or earth-penetrating tool for use in combination with regular cultivator sweeps which are raised or lowered with respect to the tractor or other supporting vehicle, and wherein the applicator is arranged to travel at a greater depth than the cultivator tools, of means in addition to the regular raising and lowering means for the cultivator gang for causing the applicator to go through an additional lifting movement so that when in transport position it will be at least as high above the ground as the regular cultivator equipment.

Another object of the invention is the provision in a fertilizer attachment for a cultivator wherein the fertilizer applicator travels at a greater depth below the ground than the regular cultivator equipment, of means operable automatically and in response to raising of the cultivator upon the traveling vehicle or other support for imparting additional lifting movement to the applicator so that it will rise at least to the same height as the regular cultivator equipment.

Another object of the invention is the provision of an improved mounting for a fertilizer applicator upon a traveling support wherein the shank of the applicator extends generally horizontally and longitudinally with respect to the direction of travel and is pivotally mounted upon the cultivator gang for rocking movement, a portion of the shank of the tool extending forwardly and being engageable with the support so that it will be depressed or held substantially in a fixed position while the balance of the tool is allowed to swing vertically during lifting of the gang.

Other objects and advantages of the invention will become clear from the following detailed description when read in conjunction with the accompanying drawings, wherein:

Fig. 1 is a view in side elevation of a tractor having mounted thereon cultivator and fertilizer applicator equipment incorporating the features of this invention, the implements being shown in their operating position; and Fig. 2 is an enlarged detail in side elevation of a portion of the structure shown in Fig. 1 and illustrating the relationship of the parts in raised position.

Referring particularly to the drawings, it will be noted that the numeral 10 designates the longitudinally extending body of a tractor having a power plant 11, one or more front wheels 12, and laterally spaced rear drive wheels 13, only one of which is shown.

Secured to and extending laterally from the side sill 14 of the tractor is a tool bar 15 which is square in cross-section, and to which is clamped a bracket 16 which serves for the pivotal connection of the forward ends of vertically spaced rearwardly extending parallel links 17 and 18. The rear ends of these links are pivotally connected at vertically spaced locations to a bracket 19, to the lower end of which is attached a tool gang generally designated by the numeral 20 and comprising a tool bar 21 which is horizontal and extends longitudinally of the tractor and has mounted thereupon one or more standard cultivating tools in the form of sweeps 22. Since the gang 20 is mounted upon the parallel links 17 and 18 which are pivotally mounted upon the bracket 16, it should be clear that the tool gang is capable of vertical movement relative to the tractor about the pivots of the parallel links on the bracket 16.

The tool gang 20 is vertically moved between operating and transport positions by conventional power lifting mechanism which, per se, forms no part of this invention, but which includes a hydraulic ram unit 23 comprising a cylinder 24 and a piston 25 slidable therein, fluid under pressure being supplied to the cylinder from a pump, not shown, deriving power from the tractor power plant. The cylinder 24 is anchored to a clamp 26 carried upon a push pipe 27 pivotally connected at its rear end to a bar 28 mounted upon an attaching bracket 29 secured to the rear axle housing 30 of the tractor. The piston 25 of the ram unit is slidable in a sleeve 31 which in turn is pivotally connected to a manually operable lever 32 mounted upon the bracket 29 and movable over a quadrant 33, the purpose of which is to adjust the extent of the stroke of piston 25. The forward end of push rod 27 is pivotally connected at 34 to a bail or lever 35 which is pivotally mounted upon the transverse tool bar 15.

A clip 36 also mounted on the forward portion of push pipe 27 is provided with a swivel 37 in which is received the upper end of a lift rod 38, the lower end of which is pivotally connected to the bracket 19. The upper portion of lift rod 38 is surrounded by a spring 39 which abuts the swivel 37 at one end and a collar 40 at the other. Thus the tool gang 20 and the parallel links 17 and 18 are capable of vertical swinging movement against the action of the spring 39 which tends to urge the tools downwardly into the ground. Extension of the piston 25 in the cylinder 24 engaging a stop suitably provided in the sleeve 31 causes forward movement of push pipe 27 and, through lift rod 38, lifting of the links 17 and 18 and tool gang 20. Thus vertical movement of the implement is provided to raise the cultivator from the position shown in Fig. 1 to the transport position shown in Fig. 2.

It may be noted that the cultivator sweep 22 in its operating position travels at a relatively shallow depth, and when raised to the position shown in Fig. 2, it is high enough above the surface of the ground to eliminate any danger of its aggressively engaging the ground during transport and causing damage to the implement. It has already been pointed out that this invention concerns a fertilizer attachment for a cultivator and is particularly concerned with the application of volatile fluids such as anhydrous ammonia for making nitrogen readily available to the plants growing in the soil. In order to avoid rapid volatilization and possible escape of the gas, it is customary to provide a furrow opener having a thin cross-section to make as narrow an opening in the surface of the soil as possible, and to so arrange it as to penetrate the soil at a considerably greater depth than the regular cultivator sweeps. With such an arrangement, however, difficulties have arisen in raising the tools to transport, the cramped quarters of a tractor mounted implement making it difficult to raise the tools to any great height above the ground, and since the fertilizer applicator travels at a much lower level that the cultivator sweep, it frequently does not clear the ground at all upon raising the tools to transport.

In order to overcome the foregoing difficulties applicants have provided a novel applicator and mounting therefor including a vertically extending standard 41 secured by a clamp 42 to the tool carrier or bar 21. Although the carrier 21 is usually square in cross-section, the standard 41 is generally made cylindrical in section for easy attachment and adjustment. The lower end of the standard 41 is bifurcated and provided with a transverse pivot pin 43 upon which is mounted the generally horizontal longitudinally extending shank portion 44 of the fertilizer applicator in the form of an earth penetrating tool 45 having a downwardly and forwardly curved rear end 46 which constitutes an earth-slitting portion and terminates at its lower end in an earth-penetrating blade 47.

Anhydrous ammonia contained in a storage tank 48 mounted upon the rear of the tractor is supplied to the soil through a flexible hose 49, the forward end of which is connected to a rigid pipe 50 secured to the rear of the earth-slitting portion 46 of the applicator 45. The lower end of the pipe 50 is connected to an extension 51 at the rear of the blade 47 which is provided with a suitable opening to permit the fluid from the tank 48 to be discharged into the furrow formed by the tool.

From the drawings it will be noted that the shank portion 44 of the applicator is pivotally mounted medially thereof upon the pin 43 for rocking movement in a vertical plane, and that the part of the shank 44 projecting forwardly from the pivot pin 43 constitutes a lever designated by the numeral 52 which, if raised or depressed relative to the pivot pin 43, will cause the earth-penetrating portion of the applicator to rise or fall in accordance therewith.

In Fig. 1, in which the applicator is shown in its operating position at a depth well below that of the cultivator sweep 22, it will be observed that the applicator is maintained in operating position by the provision of a link or connecting rod 53, the lower end of which is connected to the end of the lever portion 52 of the applicator and the upper end of which is slidably receivable in an aperture provided in an ear 54 secured to the bracket 16. Link 53 is maintained substantially rigid with an allowance for flexibility to avoid damage to the applicator by the provision of a pair of springs 55 and 56 surrounding the rod above and below the ear 54 to oppose sliding of the link 53 relative to the ear 54. The lower end of spring 55 abuts the ear 54 while the upper end engages a nut 57 upon the upper threaded end of the connecting rod. The lower spring 56 engages at its upper end the ear 54 and at its lower end a collar 58. At this point it should be clear that upon operation of the ram unit 23 acting through push pipe 27 and lift rod 38, the tool gang 20 with the applicator 45 mounted thereon may be vertically moved between operating and transport positions. It will also be observed that when the implement is moved by the operation of the lifting mechanism, as when it is raised to the transport position shown in Fig. 2, the applicator 45 is rocked about the pivot pin 43 as an axis since the rod 53 holds the end of the lever portion 52 substantially in a fixed position relative to the tractor. Therefore, by virtue of the lifting action applied to the tool gang and to the applicator 45 through the connection made with the pivot pin 43, the entire applicator is moved upwardly about the pivot axis of the lower end of rod 53 upon lever portion 52 of the applicator. Thus additional lifting movement is imparted to the applicator over and above what has been imparted to the cultivator sweep 22 so that from the operating position of Fig. 1 the penetrating blade 47 has moved from a position substantially below the sweep 22 to a position at least equal to and actually above that of the cultivator sweep in the transport position of Fig. 2. This action of the applicator 45 is automatic with the lifting operation and in response thereto, and, of course, when the implement is returned to its operating position, the applicator rocks in a clockwise direction to return to the operating position of Fig. 1.

It has previously been noted that the standard 41 is frequently made cylindrical. For this reason the applicator 45 is so shaped that in operating position the point of the blade 47 is substantially in alignment below the axis of the standard. This is made necessary by reason of the fact that the applicator is subject to torque which tends to turn the standard in its clamp, and by so positioning the applicator blade, this tendency of the tool to twist in the clamp is offset.

The operation of the retractable cultivator of this invention should be clearly understood from the foregoing description. The invention is defined in the appended claims and is to be considered comprehensive of all forms of structure coming within their scope.

What is claimed is:

1. In a cultivator adapted to be mounted upon a traveling support, a tool carrier, lifting mechanism on the support connected to the tool carrier for vertically moving the latter between operating and transport positions relative to the support, an earth-penetrating tool mounted on the carrier for movement therewith comprising a longitudinally extending shank portion and a downwardly extending earth-engaging portion, means for mounting the tool on the carrier for rocking movement in a vertical plane relative to the carrier and the support, comprising a transverse pivot connected to said shank portion medially of its ends to provide a forwardly projecting lever portion, and a link connected at one end to the support and at the other end to said lever portion to cause rocking of the tool about said pivot upon lifting the carrier to transport position.

2. In a cultivator adapted to be mounted upon a traveling support, a tool carrier, lifting mechanism on the support connected to the tool carrier for vertically moving the latter between operating and transport positions relative to the support, an earth-penetrating tool mounted on the carrier for movement therewith comprising a longitudinally extending shank portion and a downwardly extending earth-engaging portion, means for mounting the tool on the carrier for rocking movement in a vertical plane relative to the carrier and the support, comprising a transverse pivot member connecting the carrier to the said shank at a location to provide a forwardly projecting lever portion, and a substantially rigid link connected to the support and to said lever portion at a location forwardly spaced from said pivot member to anchor the forward end of the tool and accommodate rocking thereof about its pivot on the carrier upon vertically moving the carrier.

3. In a cultivator adapted to be mounted upon a traveling support, a tool carrier, lifting mechanism on the support connected to the tool carrier for vertically moving the latter between operating and transport positions relative to the support, an earth-penetrating tool mounted on the carrier for movement therewith comprising a longitudinally extending shank portion and a downwardly extending earth-engaging portion, means for mounting the tool on the carrier for rocking movement in a vertical plane relative to the carrier and the support, comprising a transverse pivot member connecting the carrier to the said shank at a location to provide a forwardly projecting lever portion, and means for holding the forward end of said lever portion in a substantially fixed position relative to the support to provide for rocking of the tool about the axis of said pivot member upon raising and lowering the tool carrier.

4. In combination with a traveling support having a tool carrier mounted thereon and lifting mechanism for vertically moving the carrier between operating and transport positions, a cultivator sweep rigidly mounted on the carrier, a fertilizer furrow opener having a shank portion pivotally mounted on the carrier and arranged in operating position to penetrate the earth at a greater depth than the cultivator sweep, and thrust means connected between the support and the furrow opener and operative upon lifting the tool carrier to swing the furrow opener shank about its pivot on the carrier and elevate the furrow opener relative to the carrier to a height above the ground at least equal to the elevation of the cultivator sweep.

5. In combination with a traveling support having a tool carrier mounted thereon and lifting mechanism for vertically moving the carrier between operating and transport positions, a cultivator sweep mounted on the carrier, a fertilizer furrow opener mounted on the carrier and arranged in operating position to penetrate the earth at a greater depth than the cultivator sweep, said furrow opener being provided with a shank portion pivoted on the carrier for rocking movement of the earth-penetrating portion in a vertical plane, and a part carried by the support connected to said shank portion and operable upon raising the carrier to its transport position to rock the furrow opener and elevate the earth penetrating portion to a height above the ground at least equal to the elevation of the cultivator sweep.

6. In combination with a traveling support having a tool carrier mounted thereon and lifting mechanism for vertically moving the carrier between operating and transport positions, a cultivator sweep mounted on the carrier, a fertilizer furrow opener mounted on the carrier and arranged in operating position to penetrate the earth at a greater depth than the cultivator sweep, said furrow opener being provided with a shank portion pivoted on the carrier for rocking movement of the earth-penetrating portion in a vertical plane and having a forwardly projecting lever portion, and a link pivotally connected to the support and to the forward end of said lever for holding the furrow opener in a substantially fixed position during operation thereof, the earth-penetrating portion of said furrow opener being swingable about the pivot of the lever portion on said link upon raising the tool carrier to transport to impart additional lifting movement to said earth-penetrating portion.

STUART D. POOL.
ERNEST M. VAN BUSKIRK.

References Cited in the file of this patent

UNITED STATES PATENTS

| Number | Name | Date |
|---|---|---|
| Re. 21,317 | Johnson | Jan. 9, 1940 |
| 1,797,476 | McCain et al. | Mar. 24, 1931 |
| 2,249,874 | White | July 22, 1941 |
| 2,591,522 | Dejoy | April 1, 1952 |